United States Patent [19]
Shinji

[11] Patent Number: 5,930,281
[45] Date of Patent: Jul. 27, 1999

[54] ION LASER APPARATUS

[75] Inventor: Toshitake Shinji, Tokyo, Japan

[73] Assignee: NEC Corporation, Tokyo, Japan

[21] Appl. No.: 08/903,172

[22] Filed: Jul. 30, 1997

[30] Foreign Application Priority Data

Jul. 31, 1996 [JP] Japan .................................. 8-202359

[51] Int. Cl.⁶ .................................................. H01S 3/03
[52] U.S. Cl. ............................ 372/61; 372/29; 372/37
[58] Field of Search ................................ 372/29, 37, 38, 372/61, 62

[56] References Cited

U.S. PATENT DOCUMENTS 3,993,965 11/1976 Alves et al. .
4,974,228 11/1990 Petersen ..................................... 372/37
5,381,432 1/1995 Kasahara ................................... 372/37
5,586,133 12/1996 Sommargren ............................. 372/29

*Primary Examiner*—Hemang Sanghavi
*Attorney, Agent, or Firm*—Sughrue, Mion, Zinn, Macpeak & Seas, PLLC

[57] ABSTRACT

An ion laser apparatus having an electromagnet for converging plasma is disclosed for providing stabilized laser operation for a long time. An electromagnet control circuit provided within a power source is capable of changing either voltage or current of the electromagnet while an ion laser tube is discharged. Due to the change of magnetic field of the electromagnet during discharging of the ion laser tube, the plasma configuration is changed while adding intensity to the convergence of the plasma within the ion laser tube, thus inhibiting a stay of a gas within a fine tube to provide stabilized laser operation.

10 Claims, 12 Drawing Sheets

T : REPEATED CYCLE

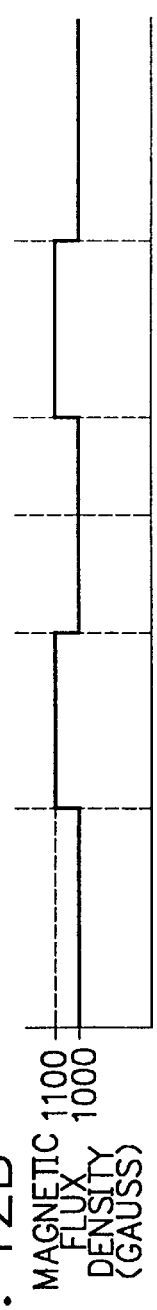
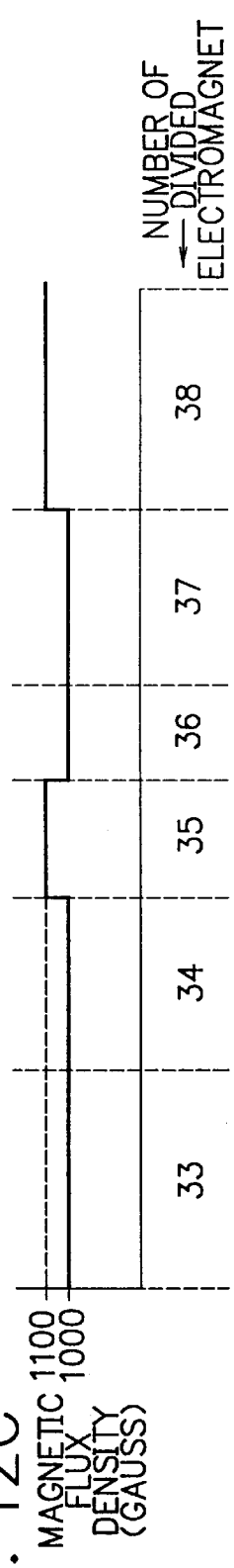

ION LASER APPARATUS

BACKGROUND OF THE INVENTION

The present invention relates to an ion laser apparatus. More to particularly this invention relates to an operation stabilizing means of the ion laser apparatus equipped with an electromagnet for converging plasma.

DESCRIPTION OF THE RELATED ART

U.S. Pat. No. 3,993,965 discloses LASER HAVING IMPROVED WINDOWS. According to U.S. Pat. No. 3,993,965, a discharge tube for a gaseous laser is terminated with windows made of crystalline quartz which do not fluoresce in the presence of high energy, visible and ultraviolet light radiation. Crystalline quartz is used for optical windows within the optical cavity of a laser. It has been found that low-impurity crystalline quartz, unlike fused silica, does not exhibit the undesirable pink or red internal fluorescence. Brewster windows made of crystalline quartz are particularly desirable for gaseous lasers operating in the ultraviolet. Increased performance also result in the visible wavelengths as well.

U.S. Pat. No. 4,974,228 discloses MAGNETIC FIELD PROFILE FOR IMPROVED ION LASER PERFORMANCE. According to U.S. Pat. No. 4,974,228, an ion laser is constructed with means for generating a magnetic confinement field operating in the cathode transition region of the laser. The magnetic confinement field is preferably generated by first and second magnetic windings, each axially aligned with the laser volume, but disposed so as to generate first and second magnetic fields which are of opposite polarity. The first and second magnetic fields of opposite polarity combine to create a region of zero axial magnetic field, which is located substantially within the cathode transition region of the laser. While the first and second magnetic fields are of the same polarity, and therefore generate a region of minimized axial magnetic field, preferably located substantially within the cathode transition region of the laser.

In general, there is provided an electromagnet for converging plasma around a fine tube of an ion laser tube for the purpose of stabilization of discharge and optimization of output in the large-sized ion laser apparatus.

Japanese Patent Application Laid-Open No. HEI 03-60085 discloses ION LASER APPARATUS. In the former ion laser apparatus, the magnetic field strength of an electromagnet for converging plasma which is applied to laser tube can be changed for the purpose of output optimization corresponding to oscillation wavelength. FIG. 1 is a constitution view showing the ion laser apparatus.

Voltage is supplied to an ion laser tube 1 by a supply-electrode 23 between an anode 3 and a cathode 2. At the outside of the ion laser tube 1, an output mirror 6 and a total reflection mirror 7 for an optical cavity are opposite to each other with the ion laser tube 1 located therebetween. An electromagnet 8 for converging plasma is located at an outer periphery section of the ion laser tube 1. The electromagnet 8 consists of a first electromagnet 21 and a second electromagnet 22. There is an electromagnet control power source 24 which supplies voltage to the first electromagnet 21 and the second electromagnet 22. Terminals of the first electromagnet 21 and terminals of the electromagnet control power source 24 are always connected to each other. One side terminal of the second electromagnet 22 and one side terminal of the electromagnet control power source 24 are connected to each other. Other terminal of the second electromagnet 22 and other terminal of electromagnet control power source 24 are connected to through a change-over switch 25. It is capable of selecting state whether or not supplying voltage is implemented to the second electromagnet 22 by connecting or separating condition between a moving piece 26 of the change-over switch 25 and the contact 27. In this ion laser apparatus, when the output mirror 6 and the total reflection mirror 7 are of use for visible rays, causing the moving piece 26 to separate from the contact 27 for obtaining optimum magnetic field in order to oscillate visible rays, with the result that a state of magnetic field of only the first electromagnet 21 with no-magnetic field is selected due to the second electromagnet 22.

While the output mirror 6 and the total reflection mirror 7 are of use for ultraviolet rays, causing the moving piece 26 to connect to the contact 27 for obtaining optimum strong magnetic field rather than the case of visible rays in order to oscillate ultraviolet rays, with the result that a state of magnetic field applied addition of magnetic field both of the magnetic field of the second electromagnet 22 and the magnetic field of the first electromagnet 21 is selected. For this reason, in any case of visible rays and ultraviolet rays, output is capable of setting to maximum value.

However, the magnetic field for converging plasma is of fixed value during driving of the ion laser apparatus. There is no technology for changing magnetic field for converging plasma during driving ion laser apparatus for the purpose of stabilization of electric discharge.

In the former ion laser tube, when a strong viscosity gas such as Krypton gas is charged, defects may occur such that discharge voltage ascends continuously, or discharge voltage becomes unstable.

A change on the discharge state occurs due to the fact that viscous gas comes to a standstill at the fine tube of the ion laser tube while plasma constitution is of a fixed state. For this reason, the ion laser tube with which strong viscosity gas is charged has a lot of restrictions such that it should permit the ion laser tube to operate with low current or it should permit the ion laser tube to limit to intermittent operation or the like.

SUMMARY OF THE INVENTION

In view of the foregoing, it is an object of the present invention to provide an ion laser apparatus wherein when viscous gas such as Krypton gas is charged in an ion laser tube, charged gas causes a stay at a fine tube wall of the ion laser tube, thus causing the plasma configuration to change. Before generating phenomena changing characteristics such as discharge voltage or optical output or the like, the ion laser apparatus permits the phenomena to become inhibited. Accordingly, the progress of deterioration of the ion laser tube accompanying the change of plasma configuration is also inhibited, so that a stabilized and long life ion laser apparatus is realized.

According to a first aspect of the present invention, for achieving the above mentioned object, there is provided an ion laser apparatus which comprises an ion laser tube, a pair of mirrors for use in an optical oscillator being opposite to each other with the ion laser tube located therebetween, an ion laser oscillator having an electromagnet for generating a magnetic field which causes plasma of the ion laser tube to converge, and an ion laser power source for driving the ion laser oscillator. The laser power source causes either voltage or current applied to the electromagnet from the ion laser power source during discharging of the ion laser apparatus to change with passage of time, thus causing magnetic field generated from the ion laser power source to change to stabilize the discharge condition.

More concretely, there is provided an electromagnet control circuit on the inside of an ion laser power source so that an ion laser tube can cause either voltage or current applied to an electromagnet to change by the electromagnet control circuit during discharging, thus permitting the magnetic field generated by the electromagnet to change.

According to a second aspect of the present invention, there is provided an ion laser apparatus wherein said electromagnet is divided into a plurality of small electromagnets in the direction of an optical axis of the ion laser tube so as to function independently. The plurality of electromagnets causes either voltage or current applied to the respective divided small electromagnet to change with time elapsed during operation of said ion laser apparatus.

More concretely, there is provided a small electromagnet control circuit on the inside of an ion laser power source so that an ion laser tube can cause either voltage or current applied to the small electromagnets provided at the ion laser oscillator to change by the small electromagnet control circuit during discharging, thus permitting magnetic field generated in the ion laser tube to change accompanying with location and time.

As stated above, according to the first aspect of the present invention, the electromagnet control circuit causes either voltage or current applied to the electromagnet to change during discharging of the ion laser tube, permitting intensity of the magnetic field generated by the electromagnet to change so that it permits intensity of the convergence of plasma to change, thus changing the plasma configuration of the ion laser tube during discharging. The change of plasma configuration of the ion laser tube prevents stay of gas at the fine tube wall, re-fluidization of stayed gas is performed too.

Particularly, since when plus and minus applied to the voltage of electromagnet reverses, the direction of rotation of plasma particle with spiral motion along the line of magnetic force reverses, the clean-up effect of the gas becomes large.

As stated above, according to the second aspect, the small electromagnet arranged along the direction of optical axis and the electromagnet control circuit cause intensity of the magnetic field generated within the laser tube to change intensity of the convergence of plasma so that it permits the plasma configuration of the ion laser tube to change. The change of plasma configuration of the ion laser tube prevents stay of gas at the fine tube wall, re-fluidization of stayed gas is performed too, so that stabilization of discharge is capable of being achieved.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 12A is a view showing distribution of generation-magnetic field at the time of operation of small electromagnets 33 and 36 of the fifth embodiment according to the present invention;

FIG. 12B is a view showing distribution of generation-magnetic field at the time of operation of small electromagnets 34 and 37 of the fifth embodiment according to the present invention; and FIG. 12C is a view showing distribution of generation-magnetic field at the time of operation of small electromagnets 35 and 38 of the fifth embodiment according to the present invention.

DETAILED DESCRIPTION OF THE PREFERRED EMBODIMENTS

A preferred embodiment of the invention will now be described in detail referring to the accompanying drawings.

Figure 1:
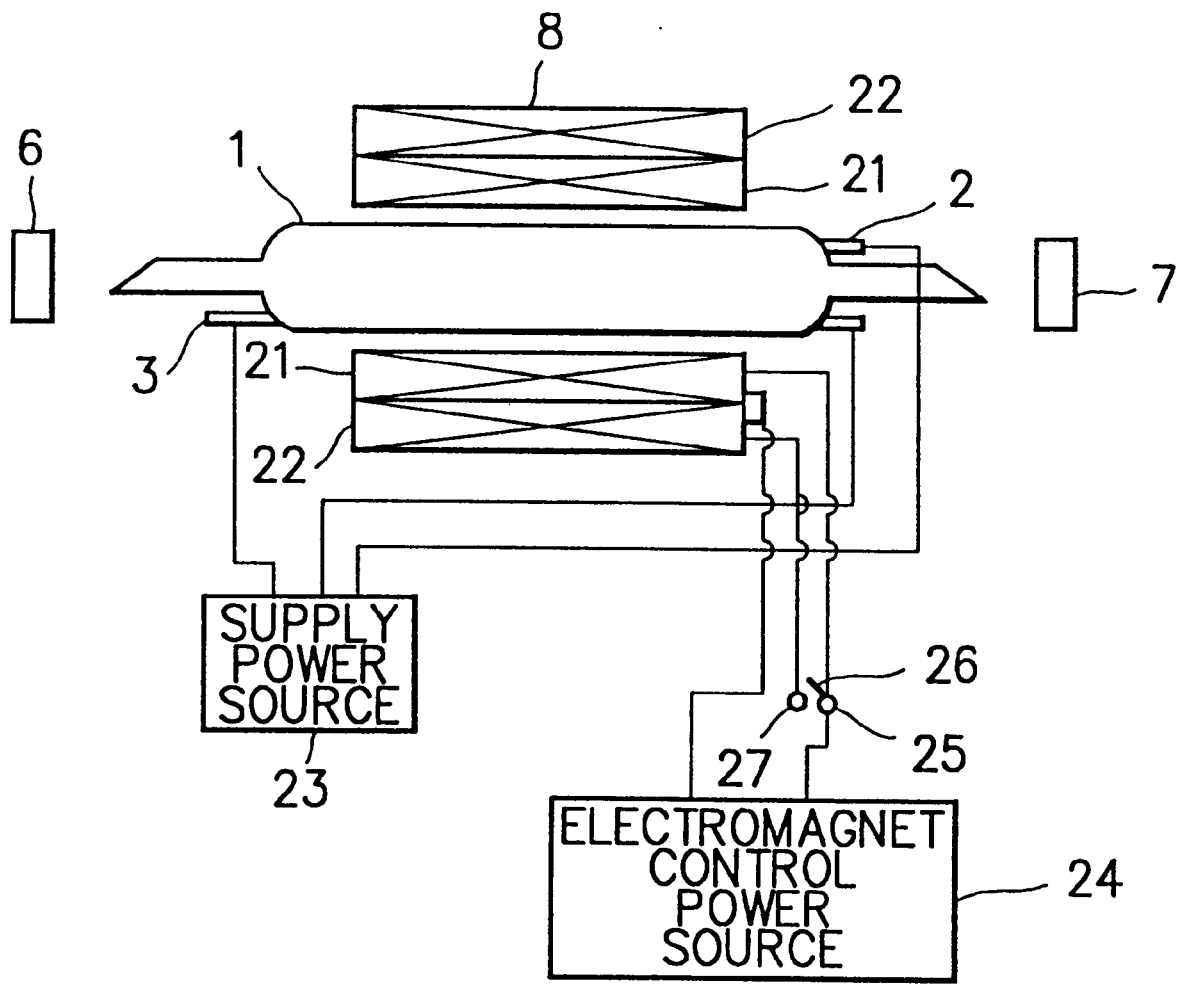
FIG. 1 is a block diagram showing schematic constitution of former ion laser apparatus as described in the Japanese Patent Application Laid-Open No. HEI 03-60085.
Figure 2:
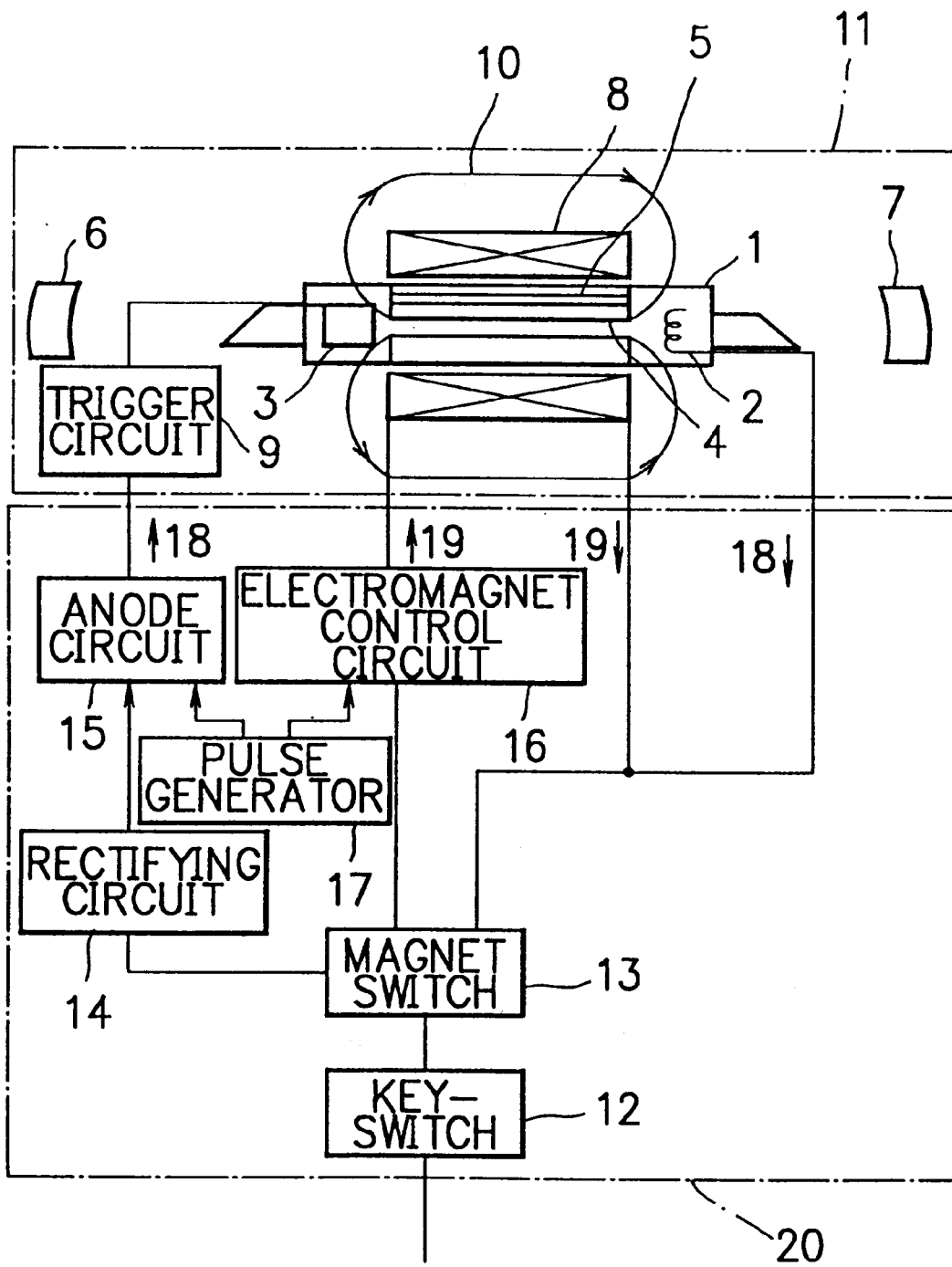
FIG. 2 is a block diagram showing schematic constitution of a first embodiment according to the present invention.

FIG. 2 is a block diagram showing a schematic constitution of a first embodiment according to the present invention.

An ion laser apparatus of the embodiment comprises an ion laser oscillator 11 and an ion laser power source 20. The ion laser oscillator 11 comprises an ion laser tube 1, an output mirror 6 and a total reflection mirror 7 for an optical cavity being opposite to each other with the ion laser tube 1 located therebetween, and an electromagnet 8 located at the outer periphery section of the ion laser tube 1 for converging plasma which radiates along a line of magnetic force being parallel to axial-direction at the inside of fine tube 4 described below. The ion laser tube 1 comprises a cathode 2 and an anode 3 which are electrodes for forming plasma, a fine tube 4 arranged between the cathode 2 and the anode 3, and a return-path 5 for gas-regression arranged parallel to the fine tube 4.

The ion laser power source 20 comprises a key-switch 12, a magnet-switch 13, a rectifying circuit 14, an anode circuit 15 for flowing anode current 18, an electromagnet control circuit 16, and a pulse generator 17 for outputting signal to the anode circuit 15 and the electromagnet control circuit 16. The electromagnet control circuit 16 can control either voltage or current for supplying to the electromagnet 8.

Figure 3:
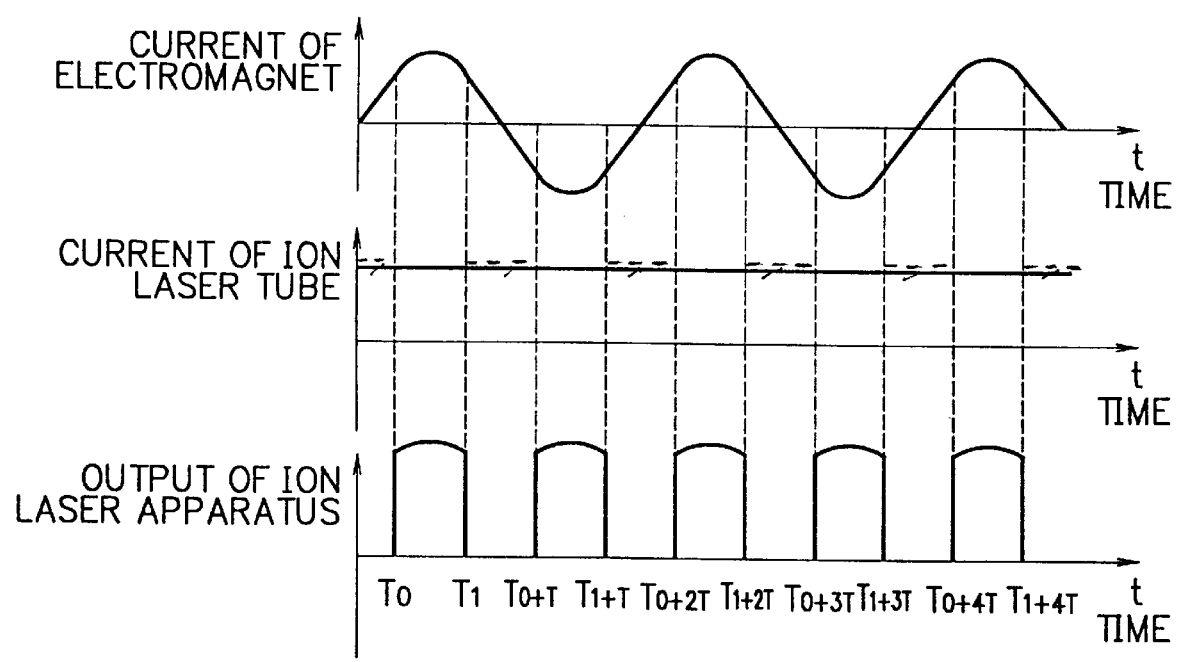
FIG. 3 is a timing chart showing operation of circuit of the first embodiment according to the present invention.

Next, operation of the circuit of the first embodiment of the invention will be described in detail referring to FIG. 3. In the embodiment, the ion laser apparatus is used intermittently. Current of the ion laser tube 1 is applied periodically and repeatedly by the pulse generator 17. It causes current of the electromagnet 8 applied by the electromagnet control circuit 16 to synchronize so as to harmonize the center of the time when current of the ion laser tube 1 flows with the peak of current of the electromagnet 8, using sinusoidal wave in which the current is synchronized with the cycle T of the ion laser tube 1 by the pulse generator 17. It is capable of affecting the intensity of the convergence for plasma because radius of gyration is changed when charged particles within the plasma performs helical motion along the line of magnetic force 10 caused by change of magnetic field accompanied with change of current of the electromagnet 8, and because whole plasma configuration is changed. A reversal of plus and minus of current of the electromagnet 8 reverses direction of the line of magnetic force, and reverses rotational direction of helical motion of the charged particle within plasma. In every time of flowing current of the ion laser tube 1, magnetic field radiated from the electromagnet 8 comes into backward, with the result that it is capable of re-fluidizing gas stayed at the fine tube-wall of the fine tube 4. Further since the current of the ion laser tube 1 is synchronized with the peak of sinusoidal wave of the current of the electromagnet 8, fluctuation of the magnetic field is small, it is capable of obtaining practically fixed laser output.

According to the above described operation, the ion laser apparatus is realized in that a stay of gas at the fine tube-wall is prevented, and characteristics of discharge and optical characteristics are stabilized, and the life ion laser apparatus is lengthened.

Next, the second embodiment of the invention will be described referring to accompanying drawings.

Figure 4:
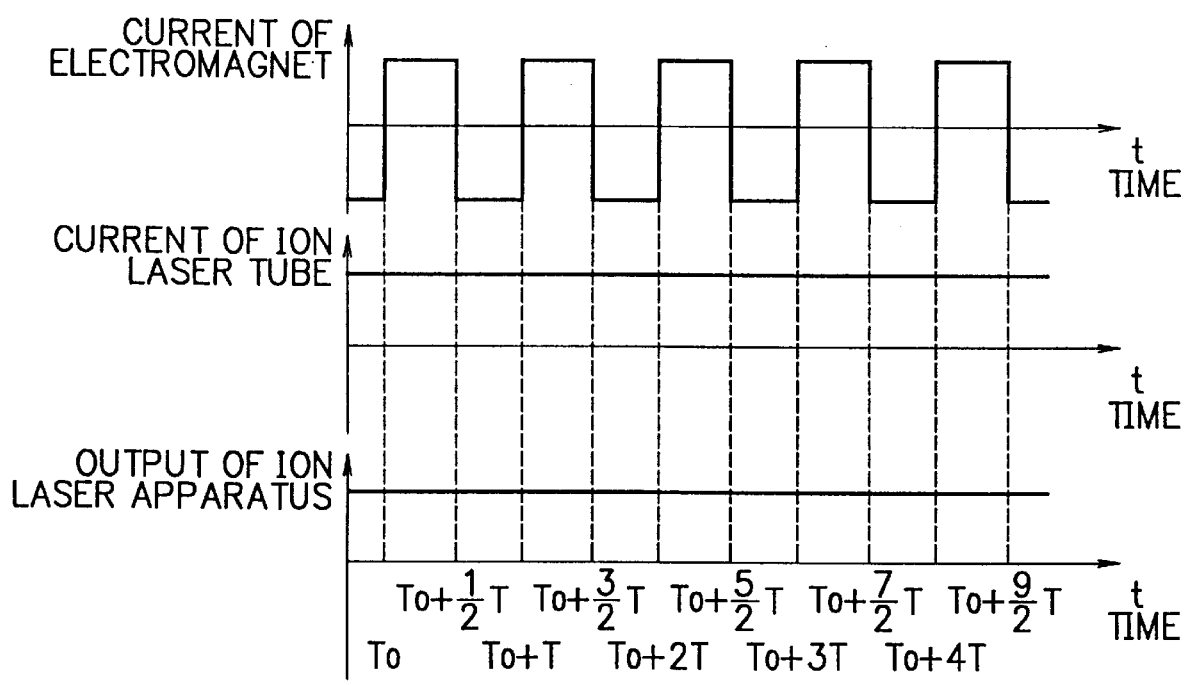
FIG. 4 is a timing chart showing operation of circuit of a second embodiment according to the present invention.

Constitution of parts of the ion laser apparatus of the second embodiment is the same as that of the first embodiment. FIG. 4 is a timing chart showing operation of the circuit of the second embodiment. A current of the ion laser tube 1 is maintained fixedly. A current applied to the electromagnet 8 is of the same magnitude of plus and minus with cycle T to be applied alternately as a square wave. In this case, the output of the ion laser apparatus is capable of bringing into approximately fixed value, because the magnetic field of the electromagnet 8 is held constant except for switching the current of the electromagnet 8. With respect to the re-fluidization of the gas stayed at the fine tube-wall of the ion laser tube 1, it is capable of obtaining the same effect as that of the first embodiment.

Current control of the electromagnet 8 with the square wave of the same sign of plus and minus in spite of different current value of the electromagnet is capable of being considered as the modified example of the second embodiment. In this case, the use is restricted in that the ion laser apparatus should be used intermittently because when current value of the electromagnet 8 is different, the output of the ion laser apparatus becomes different.

Next, a third embodiment of the invention will be described referring to the accompanying drawing.

Figure 5:
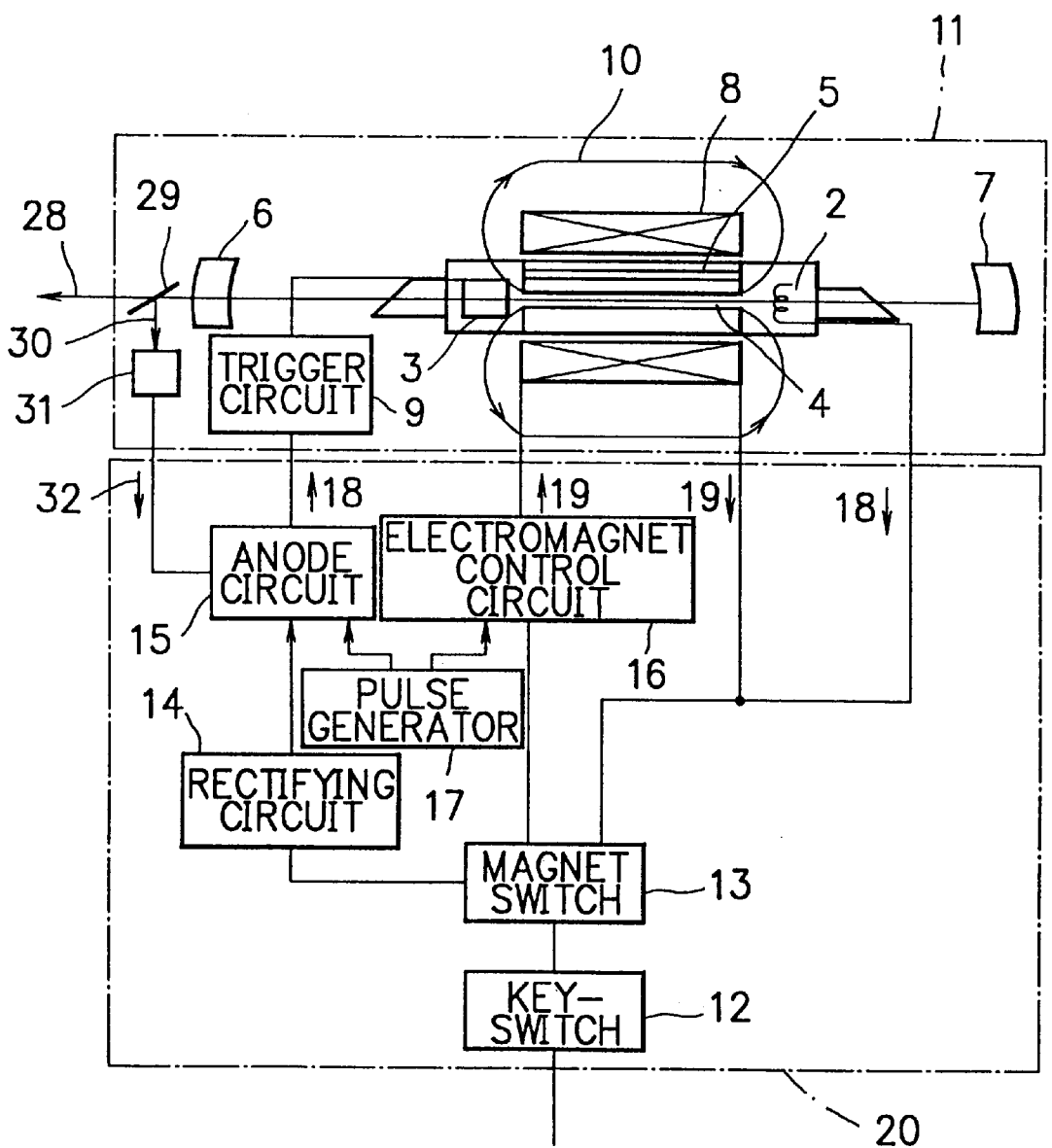
FIG. 5 is a block diagram showing schematic constitution of a third embodiment according to the present invention.

FIG. 5 shows a schematic constitution of the third embodiment. The reference numerals 1 to 20 are the same as those of the first embodiment. In the third embodiment, the ion laser apparatus has an optical feedback circuit. In this constitution, a part of the laser beam 28 is branched off as reference light 30 by the beam splitter 29. Solar battery 31 generates optical output monitor signal 32 with the reference light 30 received. The optical output monitor signal 32 is transferred to the anode circuit 15 which feedback-controls current of the ion laser tube in order that the optical output becomes the required value.

Figure 6:
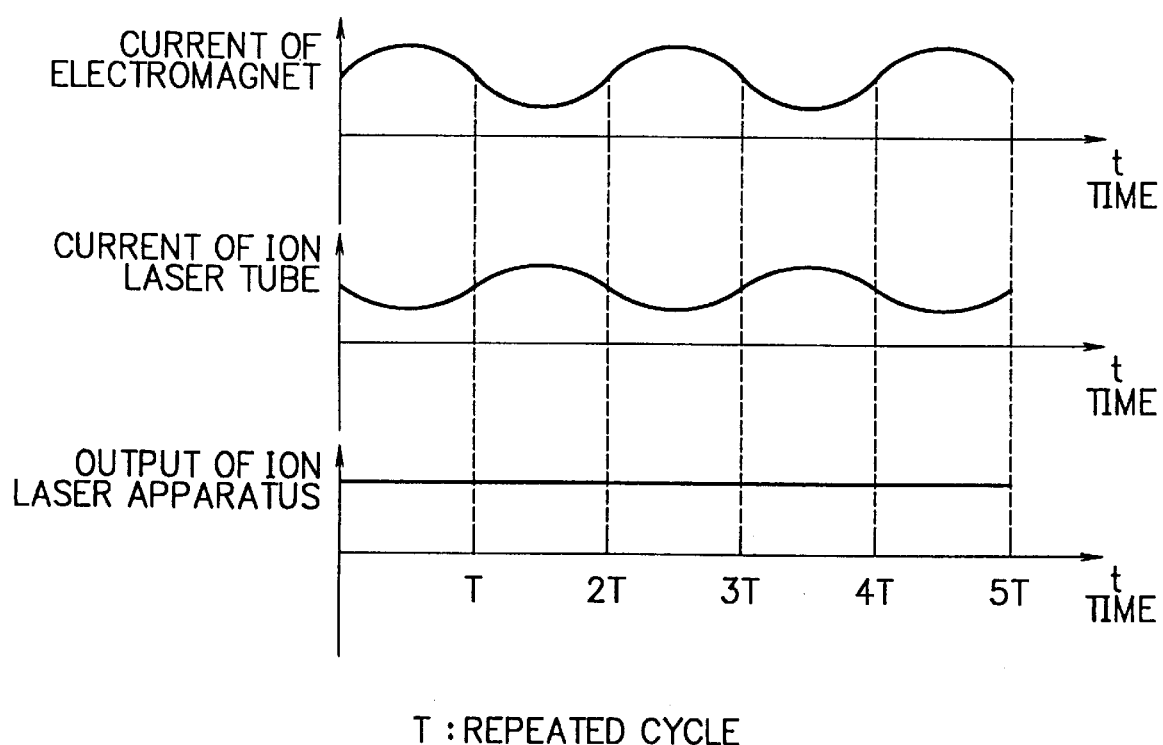
FIG. 6 is a timing chart showing operation of circuit of the third embodiment according to the present invention.

FIG. 6 shows a timing chart of operation according to the third embodiment. The pulse generator 17 changes current of the electromagnet with a sinusoidal wave, thus inhibiting gases from staying at fine tube 4, and thus actuating the optical feedback circuit. Output is kept constant by virtue of current control of the ion laser tube 1 with the result that continuous control action with a stabilized discharge state and output is realized. Further, since the pulse generator causes not only magnetic field but also current of the ion laser tube 1 to change, a change of plasma configuration is large and inhibiting effect of staying gases at the fine tube 4 is large.

Next, a fourth embodiment of the present invention will be described in detail referring to the accompanying drawing.

Figure 7:
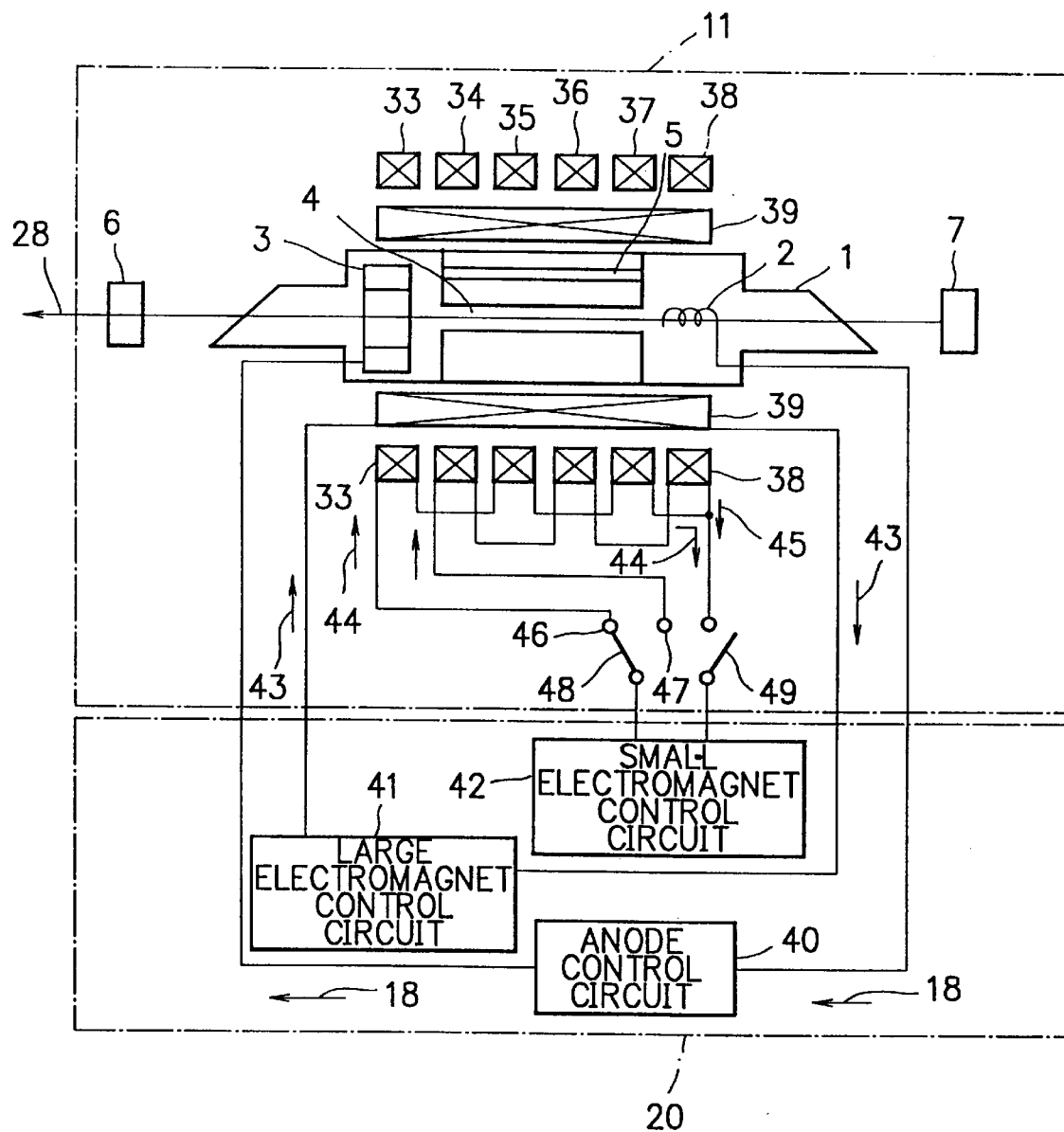
FIG. 7 is a block diagram showing schematic constitution of a fourth embodiment according to the present invention.

FIG. 7 is a block diagram showing a schematic constitution of the fourth embodiment according to the present invention.

The ion laser apparatus of the embodiment comprises an ion laser oscillator 11, and an ion laser power source 20. The ion laser oscillator 11 comprises an ion laser tube 1, an output mirror 6 and a total reflection mirror 7 for an optical cavity being opposite to each other with the ion laser tube 1 located therebetween, and small electromagnets 33 to 38 and a large electromagnet 39 located at the outer periphery section of the ion laser tube 1 for converging plasma which radiates along a line of magnetic force being parallel to axial-direction at the inside of fine tube 4 described below. The small electromagnets 33 to 38 and the large electromagnet 39 are separated to an inner-side and outer-side respectively in terms of an optic axis. In this embodiment, the small electromagnets 33 to 38 are provided for the outer-side, and the large electromagnet 39 is provided for the inner-side. The small electromagnets 33 to 38 of the embodiment consist of six pieces of small electromagnets 33 to 38 which stand side by side in the direction of the optic axis of the laser light 28. The small electromagnets 33, 35, and 37 of odd-number-row are connected in series. The small electromagnets 34, 36, and 38 of even-number-row are connected in series. The small electromagnets 33 to 38 are connected to a small electromagnet control circuit 42 of the ion laser power source 20 through an odd-number-row/even-number-row change over switch 48 and a small electromagnet ON-OFF switch 49. In addition to the small electromagnet control circuit 42, the ion laser power source 20 which is connected to the large electromagnet 39 includes a large electromagnet control circuit 41 for controlling large electromagnet current 43, and an anode control circuit 40 for controlling anode current 18.

Each of the large electromagnet control circuit 41 and the small electromagnet control circuit 42 and the anode control circuit 40 can control supply voltage and current. Explanations of the rectifying circuit 14 and the trigger circuit 9 within the ion laser power source 20 is omitted because they are unnecessary for explanation of the present invention. The ion laser tube 1 comprises a cathode 2 and an anode 3 which are electrodes for forming plasma, a fine tube 4 arranged between the cathode 2 and the anode 3, and the return-path 5 for gas-regression arranged parallel to the fine tube 4.

Figure 8:
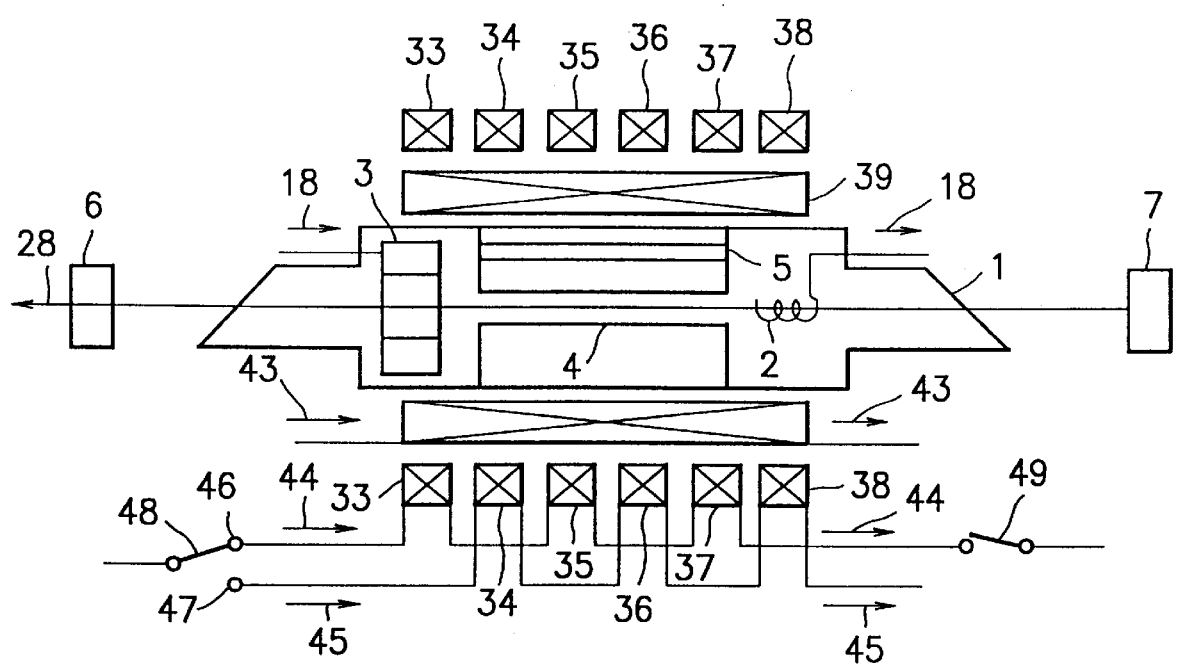
FIG. 8 is a block diagram showing operation of the fourth embodiment according to the present invention.

Next, operation of the fourth embodiment of the invention will be described in detail referring to FIG. 8.

Figures 9A, 9B, 9C:
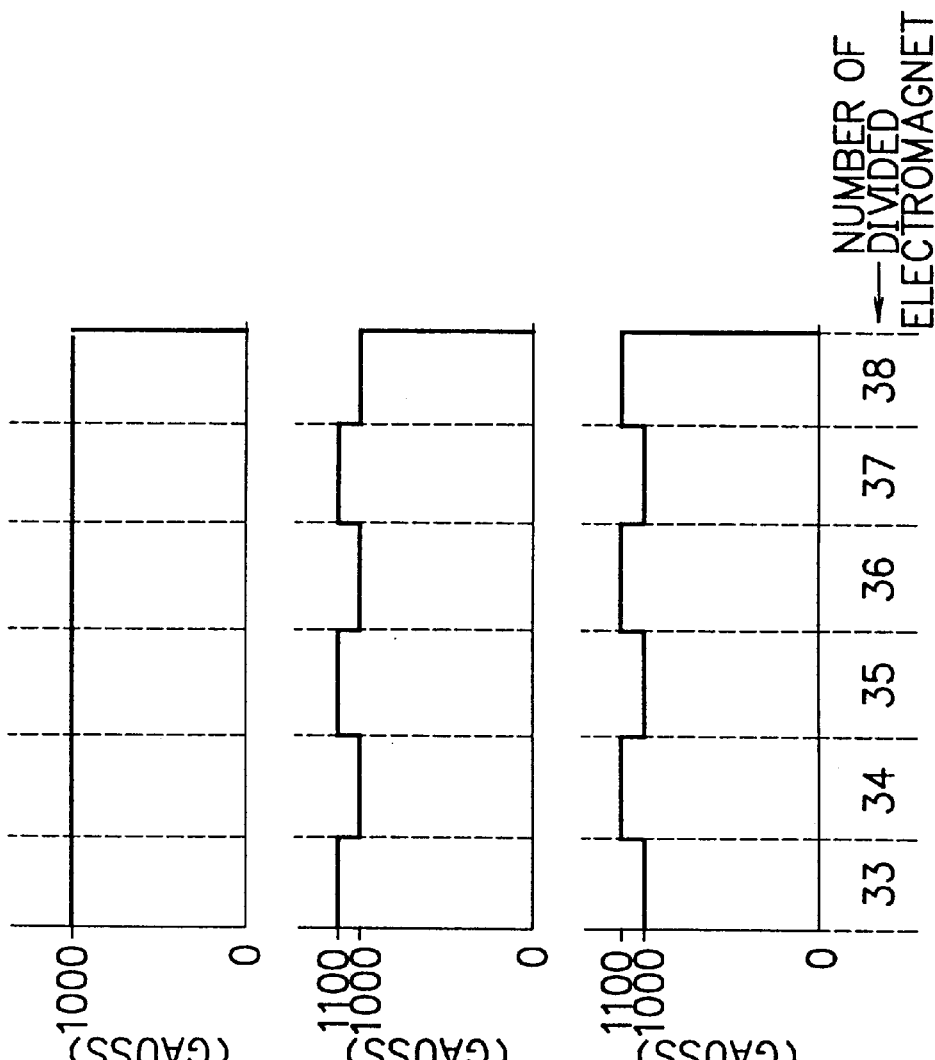
FIG. 9A is a view showing distribution of generation-magnetic field by only large electromagnet of the fourth embodiment according to the present invention.
FIG. 9B is a view showing distribution of generation-magnetic field at the time of operation of odd-number-row small electromagnet of the fourth embodiment according to the present invention.
FIG. 9C is a view showing distribution of generation-magnetic field at the time of operation of even-number-row small electromagnet of the fourth embodiment according to the present invention.

The electromagnet 39 as a fundamental structure of the general ion laser oscillator 11 will be explained. There is provided the large electromagnet 39 for making the center magnetic field in the fine tube 4 uniform and for converging plasma uniformly at the section of the fine tube 4 of the ion laser tube 1. The large electromagnet control circuit 41 connected to the large electromagnet 39 supplies fixed large electromagnet current 43. The central magnetic field within the fine tube 4 becomes uniform with regard to the direction of optic axis. The central magnetic field comes into fixed magnetic field in terms of the passage of time. FIG. 9A shows an example in which the magnetic field of 1000 gauss generates uniformly in the direction of fine tube optic axis. In FIG. 9A, the vertical axis indicates magnetic flux density (gauss) of center of the fine tube 4, and the horizontal axis indicates length of the optic axis direction with left end of the large electromagnet 39 as zero. In FIG. 9A, non operated condition of the small electromagnets 33 to 38 is shown because the ON-OFF switch 49 is open.

Next, operation of the small electromagnets 33 to 38 will be described. The small electromagnets 33 to 38 function by closing the small electromagnet ON-OFF switch 49. When the odd-number-row/even-number-row change over switch 48 closes to the side of the odd-number-row circuit contact 46, the small electromagnet current 44 of the odd-number-row flows 33→35→37 of the small electromagnets. As a result, magnetic field is generated at only each width of the small electromagnets 33, 35, and 37. In this fourth embodiment, generation-magnetic flux density according to the small electromagnets 33, 35, and 37 is 100 gauss. This is superimposed on the 1000 gauss of the large electromagnet 39, thus resulting in 1100 gauss. This is shown in FIG. 9B.

In the same manner, when the odd-number-row/even-number-row change over switch 48 changes the odd-number-row circuit contact 46 into the even-number-row circuit contact 47, the small electromagnet current 45 of the even-number-row flows 34→36→38 of the small electromagnets with the result that the condition becomes FIG. 9C.

When it causes the odd-number-row/even-number-row change over switch 48 to switch periodically between two contacts during operation of the ion laser tube 1, it is capable of adding intensity to the plasma convergency with regard to location and time in accordance with the cycle. Switching method, timing, and cycle of the odd-number-row/even-number-row change over switch 48 do not restrict the present invention.

Figure 10:
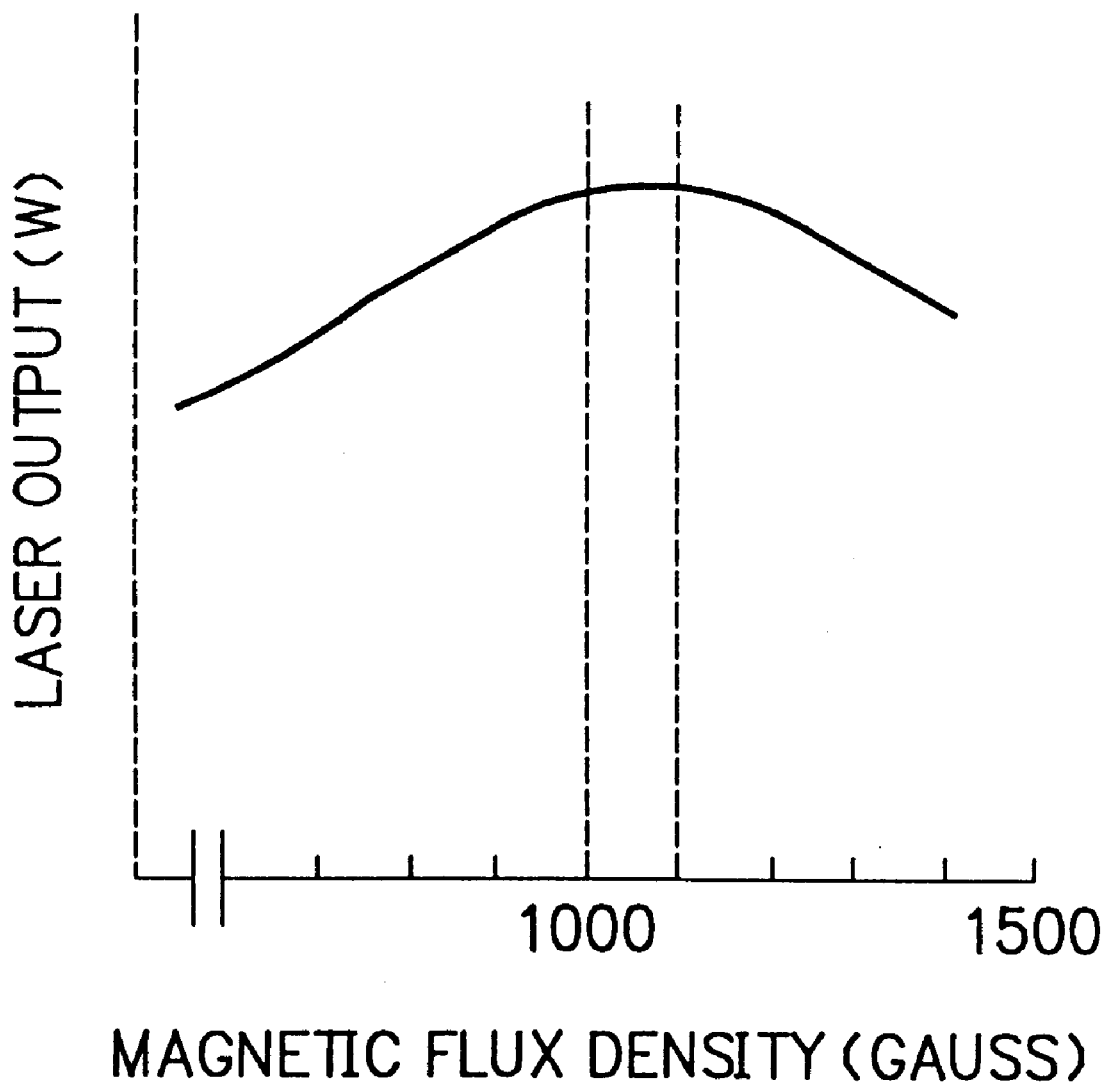
FIG. 10 is a view showing characteristic of laser output in terms of magnetic field.

FIG. 10 shows one example of output characteristic of the laser light 28 in terms of magnetic flux density of magnetic field applied to the ion laser tube 1. The output characteristic of the laser light 28 does not restrict the present invention because the output characteristic depends on wave length of the laser light 28 or the fine tube 4.

There is the condition to obtain the maximum output within the range from 1000 gauss to 1100 gauss in FIG. 10. As described in the embodiment, it causes fixed magnetic field generated due to the large electromagnet 39 to set to 1000 gauss which is slightly lower than optimum value as shown in FIG. 10. When magnetic field which changes periodically due to the small electromagnets 33 to 38 is added to the fixed magnetic field of the large electromagnet 39, total magnetic field becomes 1100 gauss which is slightly higher than optimum value. Due to the setting of the magnetic field, it is capable of diminishing fluctuation of output caused by change over of the odd-number-row/even-number-row change over switch 48 or fluctuation of the anode current 18 and discharge voltage of the small electromagnets 33 to 38. If the anode current 18 is synchronized to change accompanied with the change over with synchronization, output is capable of being further stabilized.

Incidentally, with respect to the large electromagnet 39 and the small electromagnets 33 to 38, diameter of coil winding, number of turns, and applied voltage and current are parameters on design of magnetic field which are determined in terms of wave length or output, which do not restrict the present invention.

Figure 11:
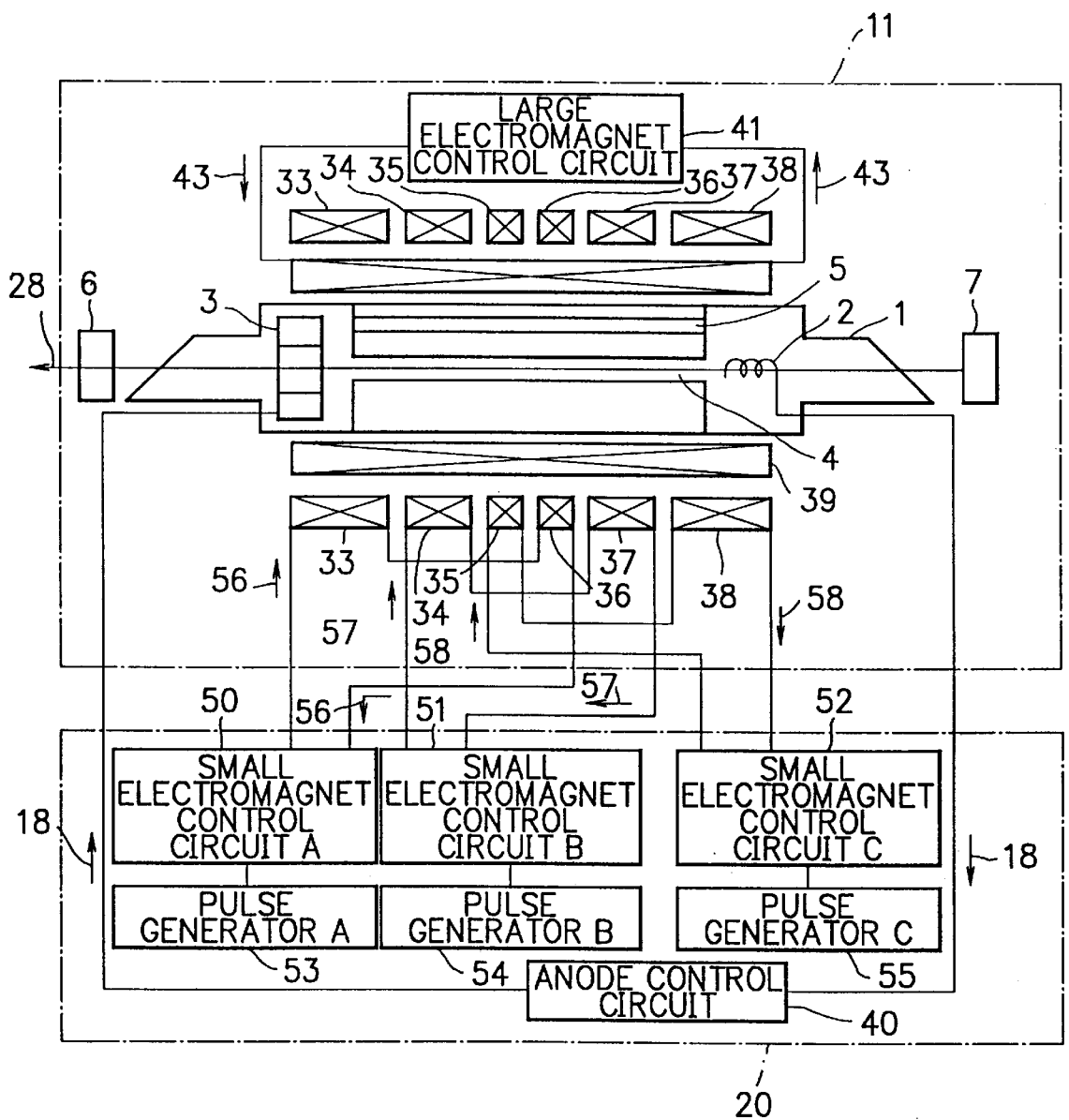
FIG. 11 is a block diagram showing schematic constitution of a fifth embodiment according to the present invention.

FIG. 11 is a block diagram showing a schematic constitution of a fifth embodiment according to the present invention. The ion laser apparatus of the fifth embodiment comprises an ion laser oscillator 11, and an ion laser power source 20. The ion laser oscillator 11 comprises an ion laser tube 1, an output mirror 6 and a total reflection mirror 7 for an optical cavity being opposite to each other with the ion laser tube 1 located therebetween, and small electromagnets 33 to 38 and a large electromagnet 39 located at the outer periphery section of the ion laser tube 1 for converging plasma which radiates line of magnetic force being parallel to axial-direction at the inside of fine tube 4 described below. The small electromagnets 33 to 38 and the large electromagnet 39 are separated to inner-side and outer-side in terms of an optic axis. In this embodiment, the small electromagnets 33 to 38 are provided for the outer-side, and the large electromagnet 39 is provided for the inner-side. In the fifth embodiment, the small electromagnets 33 to 38 consist of six pieces of the small electromagnets 33 to 38 with different length each. In FIG. 11, the first small electromagnet 33 (left end side) is connected to the fourth small electromagnet 36 in series. The second small electromagnet 34 is connected to the fifth small electromagnet 37 in series. The third small electromagnet 35 is connected to the sixth small electromagnet 38 in series. Thus three series circuits are formed.

The circuit with respect to the first and the fourth small electromagnets is connected to a small electromagnet control circuit A50 in which timing control of generation-voltage is performed by a pulse generator A53. The circuit with respect to the second and the fifth small electromagnets is connected to a small electromagnet control circuit B51 connected to a pulse generator B54. The circuit with respect to the third and the sixth small electromagnets is connected to a small electromagnet control circuit C52 connected to a pulse generator C55.

Other constitution is the same as that of the fourth embodiment described above.

Next, operation of the fifth embodiment of the invention will be described in detail referring to FIG. 11. With respect to the fifth embodiment, operation of the large electromagnet is the same as that of the fourth embodiment in that the magnetic field of 1000 gauss generates uniformly in the direction of fine tube optic axis.

In the three circuits of the small electromagnets 33 to 38, timing of voltage applying to the small electromagnets 33 to 38 is determined by the pulse generator A53, the pulse generator B54, and the pulse generator C55 respectively.

Firstly, pulse is generated by the pulse generator A53. Voltage is applied from the small electromagnet control circuit A50 to the small electromagnets 33 and 36, thus flowing a small electromagnet current A56. Since magnetic field is generated only a part of the small electromagnets 33 and 36, the magnetic field becomes 100 gauss similarly to the fourth embodiment.

Next, pulse is generated by the pulse generator B54 at the moment when the pulse of the pulse generator A53 becomes OFF, thus generating magnetic field only a part of the small electromagnets 34 and 37. Further, pulse is generated by the pulse generator C55 at the moment when the pulse of the pulse generator B54 becomes OFF, thus generating magnetic field only a part of the small electromagnets 35 and 38. The pulse generator A53 rises again after the pulse of the pulse generator C55, thus repeating this cycle. Condition of the magnetic field at the time of operation of the pulse generator A53, the pulse generator B54, and the pulse generator C55 are indicated in FIG. 12A, FIG. 12B, and FIG. 12C respectively.

Incidentally, replacement of order of operation, simultaneous operation of two pulse generators, and separated width of the separated electromagnet do not restrict the present invention.

As described above, according to the present invention, there is the first effect that it is capable of realizing the ion laser apparatus in which discharge state is stabilized for long time and life is long instead of change of discharge voltage and characteristic of the ion laser tube with passage of time. This is reason why it causes voltage and current of the electromagnet to fluctuate for changing generation-magnetic field, thus adding intensity to convergency of plasma within the ion laser tube so that the stay of gas is prevented at the fine tube wall of the ion laser tube. It is always capable of realizing operation of the ion laser apparatus under the fixed discharge condition.

There is the second effect that it is capable of realizing the ion laser apparatus in which optical characteristics such as output, optical noise and so forth are stabilized. Because, when gas stays at the fine tube in the ion laser tube, optical characteristics such as output, optical noise or the like change with discharge condition changed, while stabilized optical characteristics are obtained because the stay of gas is capable of being inhibited to the contrary.

While preferred embodiments of the invention have been described using specific terms, such description is for illustrative purpose only, and it is to be understood that changes and variations may be made without departing from the spirit or scope of the following claims.

What is claimed is:

1. An ion laser apparatus comprising:
    an ion laser tube;
    a pair of mirrors for use in an optical oscillator being opposite to each other with said ion laser tube located therebetween;
    an ion laser oscillator having an electromagnet for generating a magnetic field which causes plasma generated in said ion laser tube to converge; and
    an ion laser power source for driving said ion laser oscillator with at least one of a voltage and a current and for applying at least one of a current and a voltage to said ion laser tube,
    wherein said ion laser power source changes either voltage or current applied to said electromagnet of said ion laser oscillator in correspondence with a time in which either voltage or current is applied to said ion laser tube from said ion laser power source during discharge of said ion laser apparatus, thus changing the magnetic field generated by said electromagnet, thereby stabilizing a discharge state of the ion laser apparatus.

2. An ion laser apparatus according to claim 1, wherein either voltage or current applied to said electromagnet is a sinusoidal wave.

3. An ion laser apparatus according to claim 1, wherein either voltage or current applied to said electromagnet is square a wave.

4. An ion laser apparatus according to claim 1, wherein a viscous gas is enclosed within said ion laser tube.

5. An ion laser apparatus according to claim 4, wherein said gas is Krypton gas.

6. An ion laser apparatus comprising:
    an ion laser tube;
    a pair of mirrors for an optical oscillator being opposite to each other with said ion laser tube located therebetween;
    an ion laser oscillator having an electromagnet for generating a magnetic field which causes plasma generated in said ion laser tube to converge; and
    an ion laser power source for driving said ion laser oscillator with at least one of voltage and current and applying at least one of a current and a voltage to said ion laser tube,
    wherein said electromagnet is divided into a plurality of small electromagnets in a direction of an optical axis of said ion laser tube, and said small electromagnets arranged to function independently, and wherein said ion laser power source changes the magnetic field generated by said divided small electromagnets with time during operation of said ion laser tube, thereby stabilizing a discharge state of the ion laser apparatus.

7. An ion laser apparatus according to claim 6, wherein said divided small electromagnets are connected alternately in series to constitute two small electromagnet circuits.

8. An ion laser apparatus according to claim 7, wherein said ion laser power sources supplies at least one of voltage and current to said two small electromagnet circuits to set a periodic square wave to said to small electromagnet circuits, and repeating a timing of applying square wave.

9. An ion laser apparatus according to claim 8, wherein said ion laser oscillator further includes a large electromagnet, which is not divided and which has a circuit independent of said small electromagnet circuit, said large electromagnet being located at an inner-side coaxial position of said divided small electromagnet, and wherein a fixed DC voltage or fixed DC current is applied to said large electromagnet.

10. An ion laser apparatus according to claim 8, wherein said ion laser oscillator further includes a large electromagnet, which is not divided and which has a circuit independent of said small electromagnet circuit, said large electromagnet being located at an outer-side coaxial position of said divided small electromagnet, and wherein a fixed DC voltage or a fixed DC current is applied to said large electromagnet.

* * * * *